United States Patent
Glonner et al.

(10) Patent No.: US 7,591,331 B2
(45) Date of Patent: Sep. 22, 2009

(54) ENERGY STORAGE SYSTEM

(75) Inventors: Hans Glonner, Pfaffenhofen (DE); Wolfgang Strobl, Eichstaett (DE); Rainer Rump, Munich (DE); Josef Mallog, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/948,484

(22) Filed: Nov. 30, 2007

(65) Prior Publication Data

US 2008/0093138 A1    Apr. 24, 2008

Related U.S. Application Data

(63) Continuation of application No. PCT/EP2006/004798, filed on May 20, 2006.

(30) Foreign Application Priority Data

May 31, 2005    (DE) .................. 10 2005 024 777

(51) Int. Cl.
*B60W 10/00* (2006.01)
*B60W 20/00* (2006.01)

(52) U.S. Cl. .............. 180/65.265; 180/65.275; 180/65.285

(58) Field of Classification Search ............... 180/65.1, 180/65.2, 65.3, 65.4, 65.6, 65.8, 65.21, 65.265, 180/65.27, 65.275, 65.285; 320/134, 104, 320/167, 119, 166, 125; 322/28, 10, 171, 322/19

See application file for complete search history.

(56) References Cited

U.S. PATENT DOCUMENTS

| | | | | |
|---|---|---|---|---|
| 5,041,776 | A | * | 8/1991 | Shirata et al. .............. 322/29 |
| 5,488,283 | A | * | 1/1996 | Dougherty et al. .......... 320/125 |
| 5,559,420 | A | | 9/1996 | Kohchi |
| 5,572,108 | A | * | 11/1996 | Windes .................. 320/167 |
| 5,659,237 | A | * | 8/1997 | Divan et al. .............. 320/119 |
| 5,998,960 | A | | 12/1999 | Yamada et al. |
| 6,075,331 | A | * | 6/2000 | Ando et al. .............. 320/166 |
| 6,175,217 | B1 | * | 1/2001 | Da Ponte et al. ............ 322/19 |
| 6,242,887 | B1 | * | 6/2001 | Burke .................. 320/104 |
| 6,404,151 | B1 | | 6/2002 | Bader |
| 6,788,027 | B2 | * | 9/2004 | Malik .................. 320/134 |
| 6,919,648 | B2 | | 7/2005 | Bolz et al. |

(Continued)

FOREIGN PATENT DOCUMENTS

DE    196 28 877 A1    1/1998

(Continued)

OTHER PUBLICATIONS

The New Toyota Prius, ATZ Mar. 2004, Year 106, pp. 186-189.

(Continued)

*Primary Examiner*—Hau V Phan
(74) *Attorney, Agent, or Firm*—Crowell & Moring LLP

(57) ABSTRACT

An energy storage system is provided for an at least partially electromotively driven or drivable motor vehicle having a drive unit constructed as an electric machine for generating drive power onto a drive train. The energy storage system includes a first energy storage unit utilizing capacitive energy storage devices, and a second energy storage unit connected in parallel with the first energy storage unit and utilizing electrochemical energy storage devices.

9 Claims, 2 Drawing Sheets

U.S. PATENT DOCUMENTS

| | | | |
|---|---|---|---|
| 7,045,991 B2 * | 5/2006 | Nakamura et al. | 322/28 |
| 2004/0140139 A1 * | 7/2004 | Malik | 180/65.2 |

FOREIGN PATENT DOCUMENTS

| | | |
|---|---|---|
| DE | 198 58 348 A1 | 6/2000 |
| DE | 198 59 036 A1 | 6/2000 |
| DE | 199 21 450 C1 | 7/2000 |
| DE | 102 13 105 A1 | 11/2002 |
| EP | 1 360 090 B1 | 11/2003 |

OTHER PUBLICATIONS

Technical Journal Auto Motor und Sport, Edition Nov. 2004, Driving Report X5 Efficient Dynamics, pp. 62-64.

German Search Report dated Jan. 25, 2006 with English translation of relevant portion (Nine pages).

International Search Report dated Aug. 18, 2006 (PCT/ISA/210) with English translation of relevant portion (Six pages).

R. Bonert et al., "Super-Capacitors for Peak Load Shaving of Batteries", 7th European Conference on Power Electronics and Applications, Sep. 8, 1997, pp. 1.055-1.060, vol. 1, Conf. 7, EPE Association, Brussels.

* cited by examiner

ENERGY STORAGE SYSTEM

CROSS-REFERENCE TO RELATED APPLICATIONS

This application is a continuation of PCT International Application No. PCT/EP2006/004798, filed on May 20, 2006, which claims priority under 35 U.S.C. §119 to German Application No. 10 2005 024 777.6, filed May 31, 2005, the entire disclosures of which are expressly incorporated by reference herein.

BACKGROUND AND SUMMARY OF THE INVENTION

The invention relates to an energy storage system for an at least temporarily electromotively drivable motor vehicle, particularly for a hybrid vehicle. Furthermore, the invention relates to a hybrid vehicle having a first drive unit constructed as an internal-combustion engine and having a second drive unit constructed as an electric machine, as well as having an above-mentioned energy storage system for supplying the electric machine.

Hybrid drives having an electrical machine and an internal-combustion engine serving as drive assemblies, whose internal-combustion engine can be temporarily uncoupled in order to temporarily permit a purely electric driving operation, have a so-called electric range which, in particular, is a function of the driving profile of the route to be traveled, of the driver's vehicle handling, and of the energy content of the used electric energy storage system. Particularly conventional electrochemical battery devices or so-called supercaps or ultracaps (as a rule, in the form of double film capacitors) are known as electric storage mediums for the energy storage of electric recuperation energy and for the energy supply to an electric driving machine in a hybrid vehicle.

The Toyota Prius (*ATZ* Article—"The New Toyota Prius", *ATZ* March 2004, Year 106, Page 186 and on) provides, for example, a hybrid drive whose electric motor is supplied exclusively by way of a battery device, specifically a so-called NiMH battery (nickel metal hydride battery).

BMW follows a different concept (Technical Journal *Auto Motor und Sport*, Edition November 2004, Page 62, and on, Driving Report X5 Efficient Dynamics). The hybrid drive's electric motor is supplied exclusively by way of so-called supercaps.

In order to be able to ensure sufficient ranges (distances) in the case of electric vehicles (or in the case of hybrid vehicles having an electromotive drive) while the driving operation is purely electric, as a rule, battery devices have to be provided which have a high charging capacity. Such batteries have the disadvantage of a high weight, a large size and significant cost. Furthermore, the disposal of these battery devices also presents considerable problems.

A purely electric driving operation by way of a hybrid vehicle, in the case of which the electric driving motor is supplied exclusively by way of the so-called supercaps, permits only short distances of several hundred meters.

It is an object of the invention to provide an energy storage device for an at least temporarily electromotively drivable motor vehicle, which is improved with respect to weight and energy efficiency.

According to the invention, energy storage system for an at least partially electromotively driven or drivable motor vehicle has a drive unit constructed as an electric machine for generating a propelling power onto a transmission line. The energy storage system is used for the energy supply to the electric machine, and includes a first energy storage unit having capacitive energy storage devices, a second energy storage unit connected in parallel with the first energy storage unit and having electrochemical energy storage devices, and control devices, which are constructed such that the energy supply to the electric machine takes place during its motive operation by way of the first energy storage unit, while, as required, a recharging of the first energy storage unit takes place by way of the second energy storage unit.

As a result of the parallel connection of a first energy storage unit, which includes capacitive storage devices, and a second energy storage unit, which includes electrochemical storage devices, an energy storage system for the energy supply to an electric driving machine is created which combines the advantages of conventional supercaps with the advantages of conventional batteries. On the one hand, by means of the system according to the invention, high power peaks, as they occur, for example, when accelerating in the purely electric driving operation, can be covered by way of the capacitive storage system. However, on the other hand, longer distances can also be achieved because the conventional electrochemical battery provides sufficient power for this purpose. The invention combines the advantages of two energy storage concepts in that the energy consumption and energy decrease of high energy quantities, which is faster in the case of capacitors compared with conventional batteries, is combined with the high energy capacity of the conventional batteries by which a moderately high energy demand can also be covered over a fairly long time period.

In the arrangement according to the invention, the electric driving machine to be supplied is, as a rule, supplied directly by way of the capacitive storage unit. Depending on the charge condition of the capacitive energy storage unit and as a function of the energy demand of the electric driving machine, the electrochemically constructed energy storage unit directly supplies the driving machine or charges the capacitive energy storage device. The energy output of the electrochemical energy storage device corresponds to the mean energy demand in the electric driving cycle.

In a first preferred further development of the invention, at least one of the energy storage units, for example, by way of a plug-type connection, has a construction which can be electrically and mechanically coupled and decoupled, respectively. The electrochemical energy storage unit advantageously has as construction which can be coupled. Thus, in the event that no purely electric driving operation should be provided for longer distances, in the case of a hybrid vehicle having an internal-combustion engine and an electric machine, considerable weight can be saved and much space can additionally be made available in the vehicle.

In a further development, control devices are provided, which are constructed such that the energy supply to the electric machine during its motive operation takes place by way of the capacitive energy storage unit while, by way of the electrochemical energy storage unit, (if required) a continuous recharging of the first energy storage unit takes place. A recharging of the capacitive energy storage unit preferably only takes place when the power use of the motor is lower than the battery energy. The control devices preferably are a component of the electrochemical energy storage unit. The electrochemical energy storage unit includes, preferably in an integrated constructional unit, an electrochemical energy storage device, control devices, which are constructed as described above, as well as a DC/DC converter unit for the voltage adaptation within the energy storage system. The control devices and the DC/DC converter unit ensure the energy flux (energy inflow and outflow) between the two energy storage units, as well as the energy flux between the electric machine and one or both energy storage units. In this case, the energy flux can also be oriented and controlled from the electric machine in the direction of the energy storage units if the electric machine works, for example, in the braking or coasting operation, in the generating operation. By way of the DC/DC converter or another suitable control unit, the apportioning of the energy distribution to the two energy storage devices is controlled.

The energy storage system is advantageously coupled to the onboard power supply of a hybrid vehicle having an internal-combustion engine and an electric machine. In this case, the onboard power supply has a further energy storage unit (third energy storage unit) in the form of a conventional onboard power supply battery. The onboard power supply battery is used for feeding onboard power supply consuming devices in the event that these temporarily cannot be supplied by way of the onboard power supply generator or another electric machine operating as a generator.

The electric driving machine is preferably constructed such that it can also act as the starter for the starting operation of the internal-combustion engine and/or as a generator for generating additional power, particularly during the coasting or braking phase. Finally, it is provided to place the energy storage system according to the invention in a hybrid vehicle which has at least one driving machine constructed as an internal-combustion engine and one machine constructed in the form of an electric machine as drive assemblies.

Other objects, advantages and novel features of the present invention will become apparent from the following detailed description of the invention when considered in conjunction with the accompanying drawings.

DETAILED DESCRIPTION OF THE DRAWINGS

Figure 1:
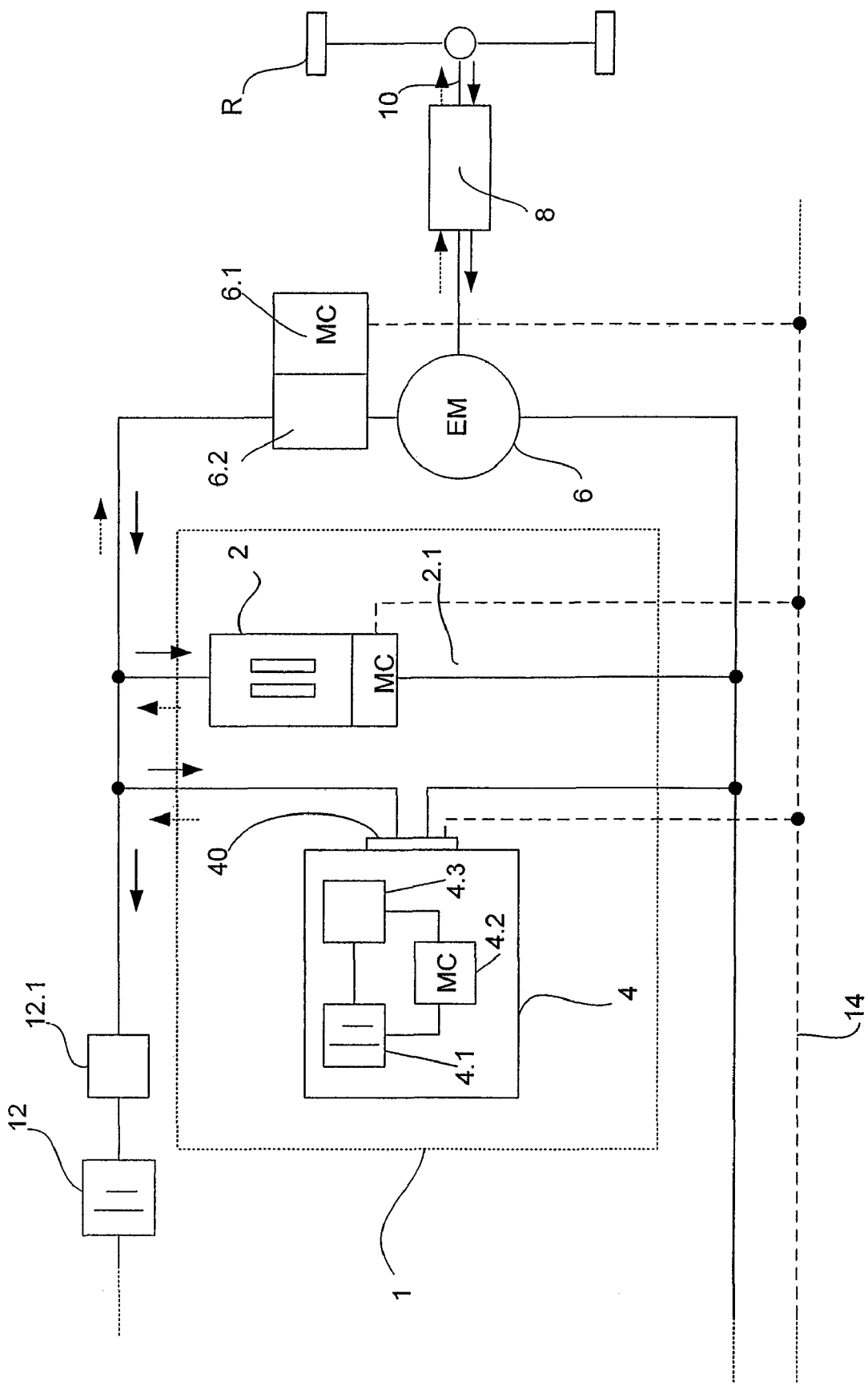
FIG. 1 is a schematic view of the energy storage system according to an embodiment of the invention.

FIG. 1 is a schematic diagram of an energy storage system 1 according to the invention, which is integrated in the onboard power supply system of an electromotively operable vehicle. The energy storage system 1 includes a first energy storage unit 2 utilizing capacitive energy storage devices, as well as a second energy storage unit 4 which is connected in parallel with the first energy storage unit and utilizes electrochemical energy storage devices. In a particularly preferred embodiment, the energy storage devices of the first energy storage unit 2 are constructed as double film capacitors (so-called supercaps or ultracaps), while the energy storage devices of the second energy storage unit 4 are formed by a conventional battery unit (such as a nickel metal hydride battery or the like).

In addition to the battery 4.1, the second energy storage unit 4 also includes a control device 4.2 and a DC/DC converter 4.3. In this case, by way of the control device 4.2 in connection with the DC/DC converter unit 4.3, particularly the energy flux between the first and the second energy storage unit 2; 4 is controlled.

Furthermore, the energy flux between the second energy storage unit 4 and the electric machine (which is preferably constructed so that it can be operated as a motor and also as a generator), which is to be supplied by way of the two energy storage units 2; 4, can be also controlled. Thereby, at least also indirectly, the energy flux between the electric machine 6 and the first energy storage unit 2 can be controlled by way of the control device 4.2 of the second energy storage unit 4. In the illustrated embodiment, the electric machine 6 drives the drive axle (10) (and thus at least one wheel R) of a motor vehicle by way of a transmission 8 connected on its output side.

The electric machine 6 communicates with an electronic system (separate or integrated in the machine), which includes an engine timing unit 6.1 and an inverter unit 6.2. The first energy storage unit 2 also optionally has a separate control device 2.1 assigned to it, whose functionality particularly consists of monitoring and ensuring the voltage symmetry of the individual cells of the capacitive energy storage unit 2. Furthermore, the voltage and current at the energy storage unit 2 are measured, so that the current storage device content is made available to the hybrid control. In addition, the control device 2.1 takes over the temperature monitoring of the energy storage unit 2.

At least the second energy storage unit 4 preferably has coupling devices 40—constructed, for example, as a plug-type connection—by which, as required, the second energy storage unit 4 can be removed from the energy storage system 1 or can be coupled thereto.

The energy storage system 1 according to the invention is preferably used exclusively for the energy supply to the electromotive drive. As required, a separate onboard power supply battery 12 is provided for the electric supply of conventional onboard power supply consuming devices. This battery 12 is also coupled with the electric machine 6 by way of a DC/DC converter unit 12.1, so that the onboard power supply battery 12 can also be charged by way of the electric machine 6, which then operates as a generator.

The lower line connection (shown by a broken line) in FIG. 1 represents a bus system 14 by which the individual control units 4.2., 2.1, 6.1 can communicate with one another and with other control units. The arrows at the other connection lines have the purpose of showing the possible energy fluxes between the individual components, the solid arrows showing the energy flux from the wheel R by way of the electric machine 6 working as a generator into the individual energy storage devices 2,4,12, and the dotted arrows illustrating the energy flux out of the energy storage devices to the wheel R by way of the electric machine 6 working as a motor. However, the dotted energy flux also describes the charging operation of the capacitive energy storage unit 2 by the electrochemical energy storage unit 4.

Figure 2:
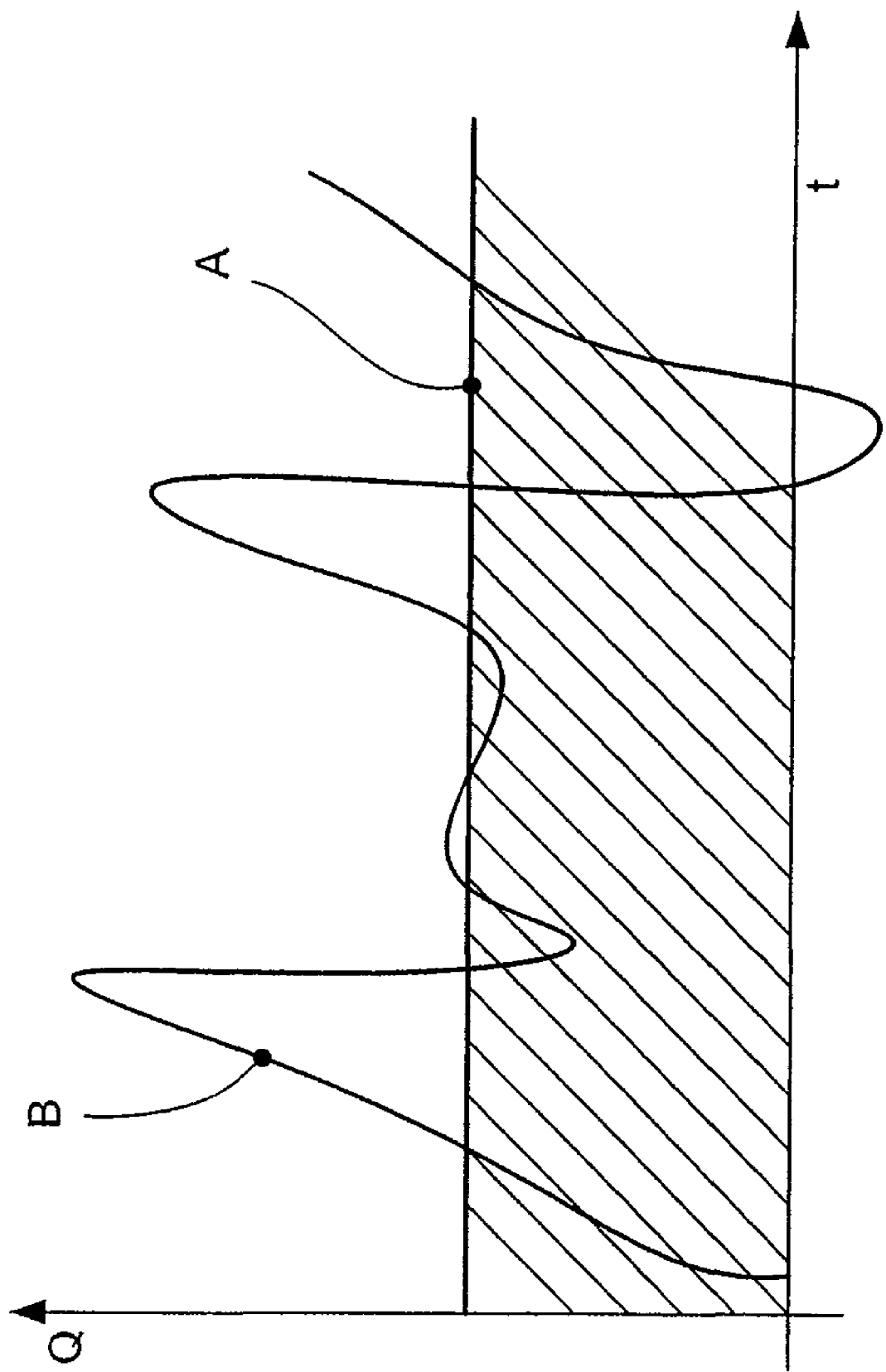
FIG. 2 is a graphical view of the drive energy required by the electric machine over time for a fictitious electric driving operation.

For a better understanding of the method of operation of the energy storage system 1, FIG. 2 graphically shows the energy demand of the electric machine 6 for any electromotive driving operation. Two courses of a curve are shown, one course A showing the maximally possible taking-up of power of the electrochemical energy storage unit 4 and the second course B showing the actual energy demand of the electric machine. In this case, the power peaks exceeding the maximally possible taking-up of power of the electrochemical energy storage unit 4 are supplied by way of the capacitive energy storage unit 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage system for an at least partially electromotively drivable motor vehicle having a drive unit constructed as an electric machine for generating a drive force on a drive train, the energy storage system supplying energy to the electric machine, comprising:
   a first energy storage unit comprising capacitive energy storage devices;
   a second energy storage unit comprising electrochemical energy storage devices, the second energy storage unit being coupled in parallel with the first energy storage unit; and
   a control system operatively configured such that the energy supply to the electric machine takes place during motive operation of the electric machine by way of the first energy storage unit while, as required, a recharging of the first energy storage unit takes place via the second energy storage unit,
   wherein the control system is further operatively configured such that occurring power peaks whose power exceeds a maximum possible taking-up of power of the second energy storage unit are supplied by the first energy storage unit.

2. The energy storage system according to claim 1, further comprising a DC/DC converter unit operatively configured to be controllable by an apportioning of energy between the first energy storage unit and the second energy storage unit.

3. The energy storage system according to claim 1, wherein at least one of the first and second energy storage units is electrically and mechanically detachably coupleable via coupling devices.

4. The energy storage system according to claim 3, wherein the second energy storage unit is electrically and mechanically detachably coupleable via coupling devices.

5. The energy storage system according to claim 1, wherein the second energy storage unit comprises the electrochemical energy storage devices, a DC/DC converter unit, and a control device forming part of the control system for controlling an energy flux.

6. The energy storage system according to claim 5, further comprising a third energy storage unit for supplying onboard power supply consuming devices of the motor vehicle.

7. The energy storage system according to claim 1, further comprising a third energy storage unit for supplying onboard power supply consuming devices of the motor vehicle.

8. An energy storage system for an at least partially electromotively drivable motor vehicle having a drive unit constructed as an electric machine for generating a drive force on a drive train, the energy storage system supplying energy to the electric machine, comprising:
   a first energy storage unit comprising capacitive energy storage devices;
   a second energy storage unit comprising electrochemical energy storage devices, the second energy storage unit being coupled in parallel with the first energy storage unit; and
   a control system operatively configured such that the energy supply to the electric machine takes place during motive operation of the electric machine by way of the first energy storage unit while, as required, a recharging of the first energy storage unit takes place via the second energy storage unit,
   wherein the control system is further operatively configured such that recharging of the first energy storage unit takes place only when a taking-up of power of the electric machine is lower than a battery power.

9. The energy storage system according to claim 8, further comprising a DC/DC converter unit operatively configured to be controllable by an apportioning of energy between the first energy storage unit and the second energy storage unit.

* * * * *